May 5, 1964 — R. M. KALLA — 3,131,687
VENTILATING SYSTEM FOR COOKING APPLIANCE
Filed March 12, 1962 — 2 Sheets-Sheet 1

INVENTOR.
RIBHI M. KALLA
BY
ATTORNEY

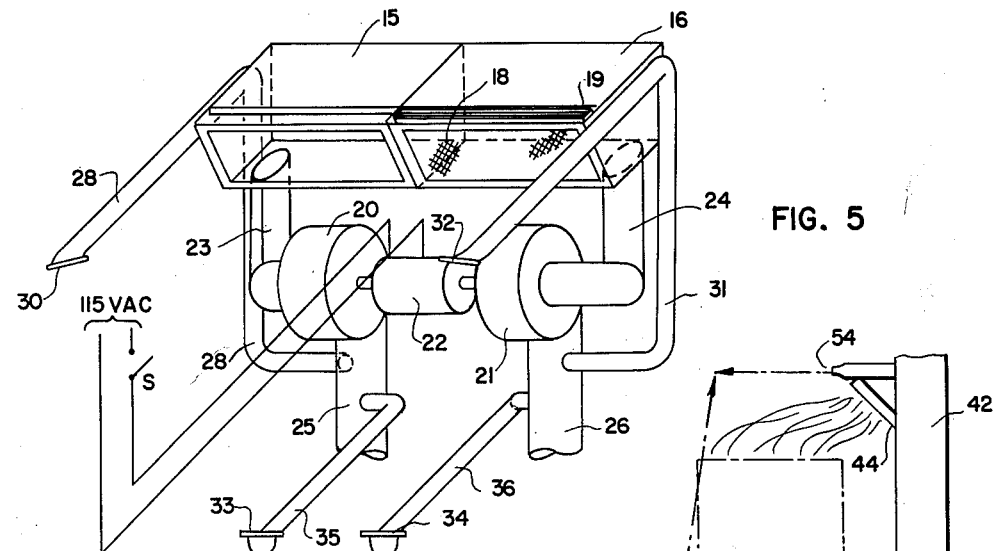
FIG. 5
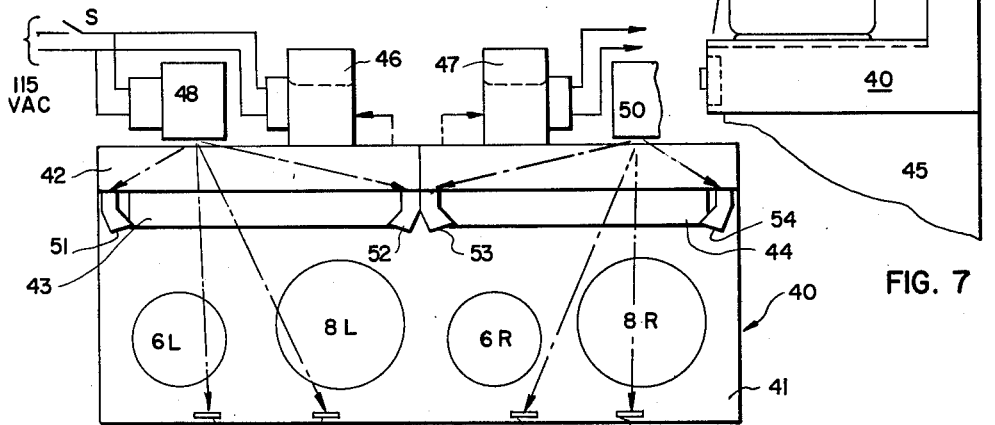
FIG. 7
FIG. 6
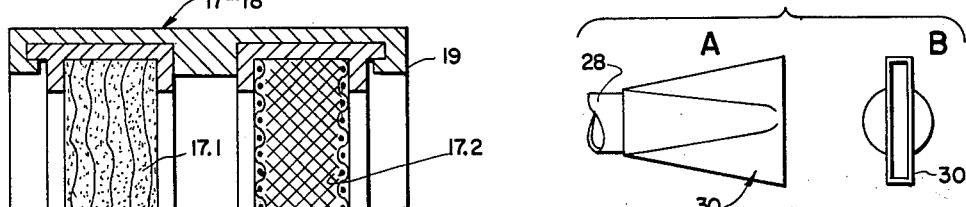
FIG. 8
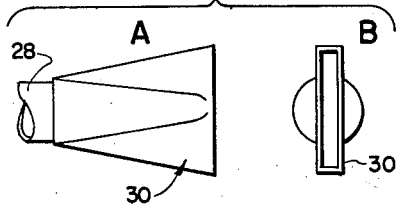
FIG. 9
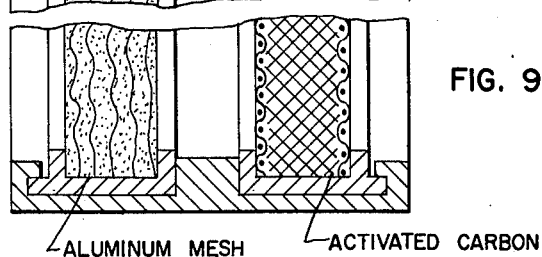
ALUMINUM MESH    ACTIVATED CARBON
INVENTOR.
RIBHI M. KALLA
BY
ATTORNEY United States Patent Office 3,131,687
Patented May 5, 1964

3,131,687
VENTILATING SYSTEM FOR COOKING
APPLIANCE
Ribhi M. Kaila, Chicago, Ill., assignor, by mesne assignments, to General Electric Company, Chicago, Ill., a corporation of New York
Filed Mar. 12, 1962, Ser. No. 179,067
8 Claims. (Cl. 126—299)

This invention relates to cooking appliances such as cook stoves having a cooking surface on which operations such as boiling and frying are performed, and in particular, to means for effectively filtering and deodorizing the vapors and smoke which are generated by such cooking operations.

Regardless of the type of cooking appliance—that is to say, regardless of whether or not the cook stove has gas burners or has electrical resistance heating elements—surface cooking operations are frequently a source of unpleasant odors and greasy vapors. In the average kitchen, both commercial and domestic, efforts have been made to alleviate this condition by the use of hoods and suction blowers which collect the vapors and discharge them to the outside. This exhaust system can be effective if the blower is large enough to insure a complete evacuation of the vapors. The average domestic system does not employ such a blower for, among other things, the heat loss from the kitchen would be substantial, and the blower itself so large as to be incompatible with domestic installations. Also, the strong flow of air into such a blower could be an annoyance to a housewife standing at the kitchen range. A recent trend in domestic kitchens has been to the ductless or recirculating type of filter system, in which greasy vapors are caught by a mechanical filter and odor-bearing particles are adsorbed within the pores of specially treated charcoal. In such an arrangement it is quite feasible to return the treated air to the room, thus simplifying the installation of the equipment, and among other things, preventing loss of room heat. This latter aspect is an important one in colder climates. Nevertheless, it has been established that any filter which depends solely on a suction system is inadequate unless the blower is capable of translating large amounts of air at quite substantial flow rates; otherwise, the random movement of the grease or odor producing particles inevitably results in a substantial portion of these particles avoiding the filter system entirely.

I have found that a relatively low volume, low pressure suction system can be used with highly satisfactory results when placed in combination with an arrangement of nozzles producing an upward air flow from spaced locations near the front edge of the cooking surface, and a horizontal air flow from an elevated location at each side of the rear of the cooking surface. When these nozzles are shaped and arranged so as to produce flat, fan-shaped air streams which intersect near the front of the range at an elevation not substantially below that of the inlet to the suction system, there is produced an inwardly directed turbulence and an air wave disturbance which is effective to direct the cooking vapors to the inlet system of the suction fan. I call this arrangement a "push-pull" system as distinguished from the straight "suction" system found in the prior art.

Data derived from a series of tests made under substantially identical conditions for both forms of system establish that in a domestic electric cooking range of conventional pattern and arrangement of surface cooking elements, a push-pull system having a suction blower moving 376 cubic feet of air per minute, and an air pressure source discharging 9 cubic feet of air per minute (total) for the two upper nozzles and 6 cubic feet of air per minute (total) for the two lower nozzles, is very appreciably more effective as respects fume and grease vapor control than a suction-only system having the same cubic feet per minute of air movement. For a suction system to be approximately as effective as a push-pull system of the above-noted parameters, the suction blower must displace approximately 500 cubic feet of air per minute.

It is therefore an object of my invention to provide a cooking range venting system which effectively reduces the escape of grease vapors and cooking odors into the kitchen, while requiring an air translation mechanism of only moderate requirements as respects total volume of air and static pressure.

It is another object of the invention to provide a venting system in which air movement is substantially unnoticeable to a person who may be standing at the range during the cooking operation.

It is a further object of the invention to provide a venting system which will have a high efficiency when cooking operations are being conducted on all of the surface cooking elements of the range.

It is yet another object of the invention to provide a venting system which maintains its efficiency substantially not influenced by the height of the cooking vessels or the arrangement of high and low cooking vessels on the range.

The manner of accomplishing these objects in a presently preferred mechanism will be understood from the following description, read with reference to the accompanying drawings in which:

FIG. 5 is a somewhat schematic perspective view of the air translation mechanism used in the FIG. 1 range;

FIG. 6 is a plan view of another arrangement of cooking units showing the location of the air discharge nozzles and suction system in a schematic manner;

FIG. 7 is a side elevation of the range shown in FIG. 6;

FIGS. 8a and 8b are respectively a plan and front elevational view of a typical nozzle; and FIG. 9 is a side sectional elevation of a composite grease and odor removal filter.

Figure 1:
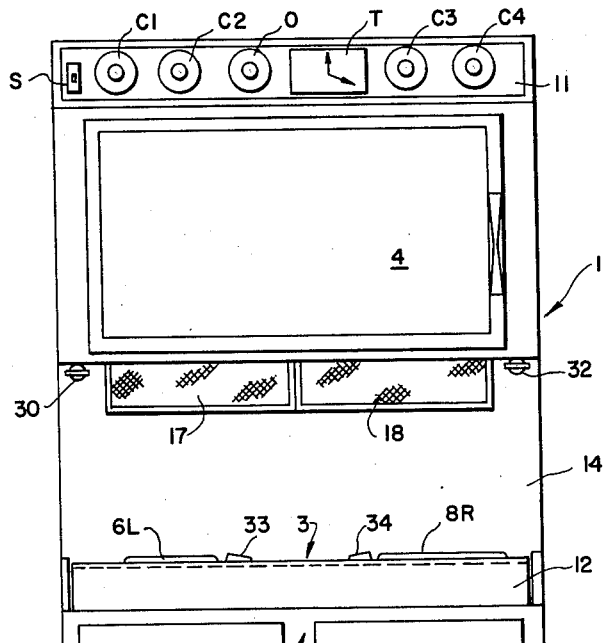
FIG. 1 is a front elevation of a cooking range embodying my invention.

Referring now to FIG. 1, the illustrated cooking range 1 is of the so-termed "30-inch" type currently popular among range manufacturers, including applicant's assignee herein. This designation relates to the overall width of the range. Furthermore, the range is of the type which is primarily intended to be placed on a conventional kitchen cabinet structure 2, although it will be understood that the range may be provided with its own base to make it of the "free standing" type. Further, the range in its illustrated form is of the type in which the "cooking surface" 3 is mounted on suitable slides or rails (not shown) whereby the cooking surface 3 may be drawn forwardly for several inches when it is desired to cook on all of the four surface cooking elements, or may be pushed inwardly to a home position in which the rear cooking elements are at least partially concealed. In this latter position cooking operations may be conducted on the front elements. Also, the range may be of the "high oven" type in which one or more ovens 4 are at an appropriate level above the cooking surface. Typically, in such a range, the bottom of the oven is from twelve to fourteen inches above the cooking surface, which of itself is thirty-two inches from the floor line. This positions the oven at a handy height for the average woman. It will be understood that ranges having these general features are very well known in the art, and are available in the gas and electric types.

Figure 2:
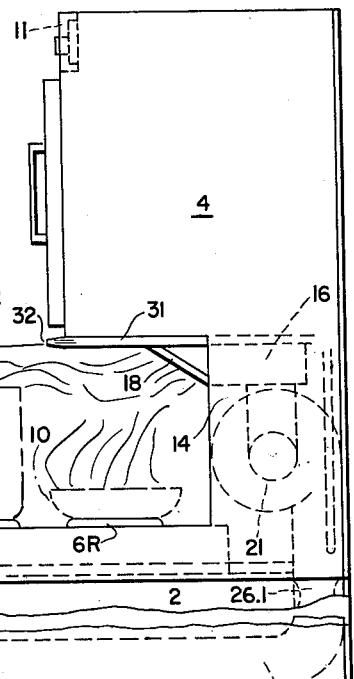
FIG. 2 is a side elevation thereof showing in broken line a tall cooking vessel on a front cooking unit and a low cooking vessel in a rear unit, and also showing the impingement of the upper and lower air jets.

The present invention is applicable to both of these types of range, and it will therefore be understood that the surface heating elements may be of either form. In conventional electric range practice six-inch and eight-inch diameter heating elements are used; thus 6L and 8L respectively designate a six-inch element and an eight-inch element at the left of the cooking surface, and 8R and 6R designate an eight-inch and a six-inch diameter element at the right of the cooking surface, all as viewed from the front of the range. It is considered good design practice to stagger the six-inch and eight-inch surface cooking elements in the illustrated fashion; it is advantageous to have at least one of the larger diameter elements at the front of the range when the range is of the high oven type, for it is on the larger diameter units that tall cooking vessels such as the nine-inch high cooking vessel 9, FIG. 2, are placed. It would obviously be somewhat inconvenient for the cook to have a nine-inch tall pot on a rear element, for there would be inadequate clearance relative to the overhanging oven structure. Rear units are very adequate for low skillets, fry pans and the like, as illustrated at 10, FIG. 2.

A recessed control panel 11 above the oven accommodates the controls C1, C2, C3, C4, for the respective surface units; a temperature controller O for the oven, a time controller T for oven time control, and a manual switch S for the control of the ventilating system, presently explained. Except for the switch S, for which a single-pole, single-throw, toggle switch is adequate, the other controls are of the conventional type which are operable to produce a desired thermal output at the surface heating units and oven. In an electric range all of the control switches may be in the upper control panel; in a gas range the oven controls O and T and the switch S may be on the upper panel, but it is more practical to place the surface unit controls on the front wall 12 of the cook top 3.

Essentially the first departure from conventional construction, is in the structure which provides the rear wall 14. This wall extends the full width of the range and may be of the order of ten inches deep, inside dimension. Within this wall are contained the structures 15 and 16 which provide inlet chambers for the suction systems; said chambers have open fronts within which are removably mounted the filters 17 and 18. These filters may be of the composite type well known in the art in which the upstream filter 17.1 is of the mechanical grease trapping type consisting of an interwoven mesh of aluminum strands, and the second filter, 17.2, includes a layer of activated carbon within the pores of which the odor bearing particles issuing from the cooking vessels are adsorbed. A cross-section of such a filter is shown in FIG. 9. It will be understood that the filters are removable from the chambers 15 and 16, and that the filter elements 17.1 and 18.1 are individually removable from the mounting frame 19. The grease filter 17.1 may be washed in a detergent solution to remove the entrapped grease and as well known in the art, the activated carbon filter 17.2 may be heated in the range oven to reactivate it. The type and arrangement of the filter structures does not appear to be of critical importance to the present invention.

Within the wall 14 are the suction blowers 20, 21 which, as illustrated in FIG. 5, may be driven from a common electric motor 22. It is quite possible to have a single suction blower, although size and weight limitations are a factor of some concern. As previously indicated, the requirements of the push-pull system are a "suction" air movement of about 375 c.f.m. and a "pressure" air movement of about 15 c.f.m. total. In view of the fact that a single blower may provide both suction and pressure in the illustrated system, the respective blowers 20 and 21 should have a capacity of about 200 c.f.m. each. A blower of this size is quite compact, with small power requirements. The respective inlet chambers communicate with the blower casings by the respective ducts 23 and 24, and the respective discharge ducts 25 and 26 take the air to a convenient point of discharge. The ducts may discharge externally of the building if the range is conveniently located, or as suggested in FIG. 2, may discharge into the kitchen through the louvered toe space 27 at the base of the kitchen cabinet.

To provide the pressure air supply for the system, a duct 28 leads from conduit 25, rises upwardly at the side of the range (within the wall structure 14) and then forwardly below the oven to terminate in the nozzle 30. A duct 31 leads from conduit 26, rises upwardly and then forwardly below the oven to terminate in the nozzle 32. A typical nozzle is shown in FIGS. 8a and 8b; the duct size is preferably one-half inch inside diameter, and the discharge port of the nozzle is of the order of one inch by one-eighth inch, inside dimension. The respective nozzles 30 and 32 provide a fan-shaped, essentially flat, discharge which is immediately above the effective inlet area represented by the filters 17 and 18; the nozzles are directed so that the air blasts intersect above the tallest cooking pot normally used on a domestic cooking range. Such a pot is usually not more than nine inches high. Coffee pots may be as much as eleven inches high, but need not be considered, for they are not a source of unpleasant odors. Each of the nozzles 30 and 32 discharges about 4.5 c.f.m. at a static pressure of about .90 inch, water gauge. The velocity of discharge is of the order of 3800 feet per minute.

Also, the respective blower discharge conduits supply air for issuance at .50 inch water gauge pressure for the front nozzles 33 and 34, which have the same discharge area as nozzles 30 and 32. The velocity of discharge from the lower units is of the order of 2800 feet per minute.

Figure 3:
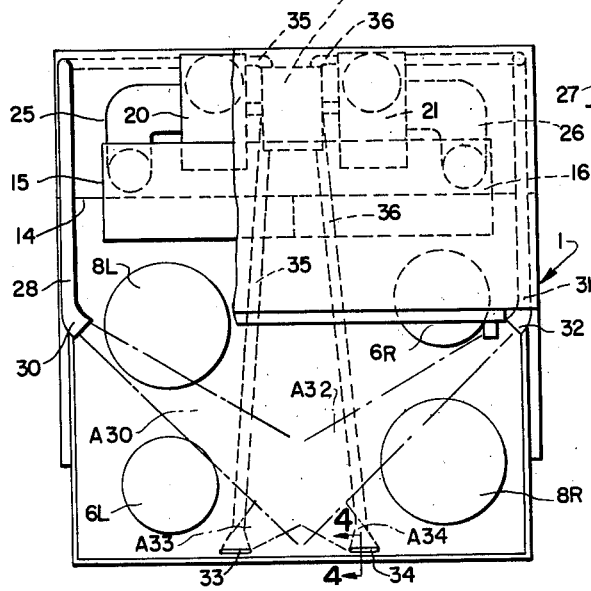
FIG. 3 is a plan view of the cooking range of FIG. 1 with a portion of the upper structure broken away to disclose otherwise concealed components.
Figure 4:
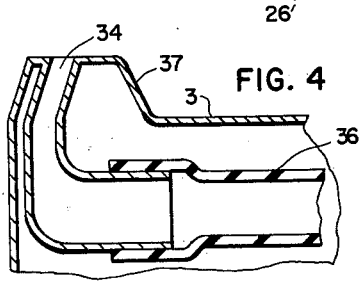
FIG. 4 is an enlarged side sectional elevation of a front nozzle taken on line 4—4 of FIG. 3.

The conduits 35 and 36 respectively connecting the nozzle 33 with discharge duct 25 and nozzle 34 with discharge duct 26, are run through the hollow structure defining the cooking surface 3; and in view of the fact that the cooking surface structure is arranged for sliding movement, the respective conduits 35 and 36 are made of suitable heat-resistant flexible tubing. The conduits pass through openings (not shown) at the rear of the cooking surface structure. Contemporary cooking ranges are made with a raised rim (37, FIG. 4) which extends about the periphery of the cooking surface to prevent spilled liquids from spilling over onto the floor. Since it is obviously desirable to prevent such spillage from passing into the nozzles 33 and 34, I arrange these nozzles so that they occupy this raised rim at the front of the cooking surface. As shown in FIG. 1, the nozzles 33 and 34 are slanted so that the flat, fan-shaped, air blast issuing from each of them intersects above the range. Also, as best shown in FIG. 4, the nozzles are sloped rearwardly so the air blasts issuing therefrom are directed rearwardly of the front edge of the cooking surface 3. An inclination of fifteen degrees from the vertical has been found very effective. The result of the arrangement of nozzles is indicated in FIGS. 3 and 2. FIG. 3 shows that the air blasts A30 and A32 from the nozzles 30 and 32 intersect above the cooking surface and between the cooking elements 6L and 8R, and that the air blasts A33 and A34 from the nozzles 33 and 34 are directed into the area of intersection of the blasts A30 and A32. FIG. 2 shows that the blast A32 is essentially horizontal, above the level of the filters, and above the cooking vessel 9, which as noted, is representative of the largest cooking vessel ordinarily used on the range. FIG. 2 also shows that because of the inclination of the front nozzles, the air blast therefrom, as represented by A34, intersects the horizontal blast rearwardly of the front edge of the cooking surface structure.

The result of this air blast action is that the intersecting air streams diffuse laterally and rearwardly, forming, in a sense, an air canopy or curtain which substantially extends over the cooking vessels to intercept steam and vapors issuing therefrom. More importantly, however, the disposition of the air blasts produces a rearward force component which changes the average velocity vector of the vapor and fume particles from a vertical path to a substantially horizontal one. Because of this transition of velocity vectors, the vapor and fume particles are directed toward the filters 17 and 18—that is to say, toward the inlets of the air suction systems. As previously indicated, best results are obtained by using a substantially less discharge velocity at jets 33 and 34 than at jets 30 and 32; specifically, the air velocity from jets 33 and 34 is 2800 feet per minute, compared with 3800 feet per minute from jets 30 and 32. To accomplish these velocities and the previously noted velocity vector transitions, the inlet pressure at the inlet of the respective conduits 28 and 31 is of the order of .75 water gauge, and the static pressure of discharge for the nozzles 30 and 32 is .90 inch water gauge. The static pressure at the inlet of the conduits 35 and 36 is of the order of .3 inch water gauge, and the static discharge pressure at the nozzles 33 and 34 is of the order of .5 inch water gauge.

The blower discharge pressure necessary to provide the specified static pressures at the inlet ends of conduits 28 and 31 and conduits 35 and 36 may be accomplished by one or more restrictions in the discharge conduits, as suggested at 26.1 in the discharge conduit of blower 21, FIGURE 2, and by appropriately configurating the inlet connections to the several air pressure conduits, as well known by those familiar with the flow and behavior of gaseous fluids.

The following test results are based on visual observations of the flow pattern of steam rising from cooking vessels of two inches, four inches and six inches height, placed in various arrangements on some or all of the four surface heating units. The efficiency indexes are the relation of the amount of steam flowing to the suction inlets, as represented by the inlet filters 17 and 18, to the total issuance of steam from the cooking vessels. Because the rear cooking elements are inherently advantageously placed as respects pickup by the suction inlets, and have the further advantage of being below the overhanging oven structure, the pickup from rear units was in all respects good, and it can be assumed that the pickup was primarily the result of the suction system only. In other words, the cooking vessels on rear units were not critically subject to the influence of the air jets. The following tabulation of observed results is, therefore, based only on the flow of steam issuing from vessels placed on the front units. System "A" is the suction system only, and the efficiencies are tabulated for the various suction volumes in cubic feet per minute. System "B" is the push-pull system of the present invention, with the suction component tabulated for the same volumes as system "A," and in all cases with a total of fifteen cubic feet per minute issuing from the nozzles at the specific volumes and static pressures above noted.

[Pan arrangement; height of test pans, inches]

| Test No. | 1 | | 2 | | 3 | | 4 | |
|---|---|---|---|---|---|---|---|---|
| | L. | R. | L. | R. | L. | R. | L. | R. |
| Rr. Units | 4 | 4 | 4 | 6 | 4 | | | |
| Fr. Units | 2 | 6 | 4 | 2 | 4 | 6 | 2 | 6 |

A

| Suct., c.f.m.: | | | | | | | | |
|---|---|---|---|---|---|---|---|---|
| 250 | 60 | 30 | 20 | 40 | 10 | 50 | 40 | 10 |
| 310 | 70 | 40 | 50 | 70 | 10 | 75 | 70 | 30 |
| 376 | 80 | 70 | 70 | 90 | 30 | 95 | 80 | 50 |
| 434 | 90 | 90 | 75 | 100 | 60 | 100 | 100 | 60 |
| 486 | 100 | 100 | 100 | 100 | 80 | 100 | 100 | 85 |

B

| Suct., c.f.m.: | | | | | | | | |
|---|---|---|---|---|---|---|---|---|
| 250 | 85 | 40 | 70 | 70 | 30 | 80 | 90 | 30 |
| 310 | 90 | 60 | 85 | 80 | 40 | 90 | 95 | 50 |
| 376 | 85 | 80 | 95 | 95 | 80 | 100 | 100 | 70 |
| 434 | 100 | 95 | 100 | 100 | 95 | 100 | 100 | 80 |
| 486 | 100 | 100 | 100 | 100 | 95 | 100 | 100 | 90 |

| Test No. | 5 | | 6 | | 7 | |
|---|---|---|---|---|---|---|
| | L. | R. | L. | R. | L. | R. |
| Rr. Units | | | | | | |
| Fr. Units | 6 | 6 | | 6 | 4 | 4 |

A

| Suct., c.f.m.: | | | | | | |
|---|---|---|---|---|---|---|
| 250 | 20 | 20 | | 10 | 30 | 30 |
| 310 | 40 | 40 | | 30 | 60 | 60 |
| 376 | 50 | 50 | | 40 | 90 | 90 |
| 434 | 80 | 80 | | 60 | 100 | 100 |
| 486 | 90 | 90 | | 90 | 100 | 100 |

B

| Suct., c.f.m.: | | | | | | |
|---|---|---|---|---|---|---|
| 250 | 40 | 50 | | 40 | 70 | 70 |
| 310 | 75 | 70 | | 65 | 90 | 90 |
| 376 | 90 | 80 | | 85 | 100 | 100 |
| 434 | 95 | 95 | | 90 | 100 | 100 |
| 486 | 95 | 95 | | 90 | 100 | 100 |

The test results show that in each of the tests, and for each of the suction volumes, the efficiency index of the push-pull system is better than for the straight suction system, and that a most impressive improvement in efficiency index is at the suction volume rate of 376 cubic feet per minute.

FIGS. 6 and 7 somewhat schematically show a cooking range 40 in which the cooking surface 41 is equipped with two six-inch and two eight-inch surface cooking elements arranged in a single row. The front to rear dimension of the cooking surface may therefore be less than that of the range 1. No oven is present on the range 40; the rear wall structure 42 is high enough so that the filters 43, 44 are above the maximum height cooking vessel to be used on the range. The space 45 below the range 40 may be occupied by one or more ovens and by the respective suction blowers 46 and 47 and by the respective pressure blowers 48 and 50.

The range ventilating system of FIGS. 6 and 7 is characterized by the fact that there are two systems, each having a suction blower and a pressure blower, whereby the user may operate each system independently if desired. The electrical power arrangement is obvious. At the top of the backsplasher, so as to be above the filter units, are the nozzles 51, 52 and 53, 54, respectively for the left hand and right hand group of surface cooking units; and at the front of the cooking surface are the nozzles 55, 56 and 57, 58, respectively for the left hand and right hand group of units. The type and disposition of the several nozzles is as previously disclosed. For simplification of showing, the ducts connecting the blowers with their associated nozzles have been indicated in dotted line, as have been the inlet lines to the suction blowers. It will be understood that the air discharge volume from the nozzles of each system totals fifteen cubic feet per minute and at the static pressure previously disclosed. In each also the suction blowers have a discharge rate of substantially 376 cubic feet per minute.

No comparative tests were run on a range having the arrangement of FIGS. 6 and 7. However, in view of the fact that the system corresponds substantially in all respects to the front unit arrangement and push-pull system of the FIG. 1 embodiment, it may be presumed that similar efficiencies would be obtained.

While there has been described what is at present thought to be the preferred embodiment of the invention, it will be understood that various modifications may be made therein and it is intended to cover in the appended claims all such modifications as fall within the true spirit and scope of the invention.

I claim as my invention:

1. A cooking range comprising, in combination, structure providing a horizontal cooking surface, a plurality of cooking units arranged in at least one front row along said surface, structure providing a wall extending upwardly from said cooking surface structure rearwardly of said cooking units, an air inlet system extending behind said wall and having air inlet means openly facing said cooking surface at a level whereby vapors released during cooking operations on said units can flow to said air inlet means in a generally upward and rearward direction, air filtering means in said air inlet system, a first air discharge system to discharge a sheet-like flow of air rearwardly of the front of said cooking surface and moving forwardly of said wall structure above said air inlet means and substantially parallel to said cooking surface, a second air discharge system to discharge a curtain-like flow of air extending upwardly and rearwardly from the front of said cooking surface to intersect said first-named air flow rearwardly of said cooking surface front and forwardly of said cooking units, and power operated blower means communicating with said air inlet system downstream of said filtering means on intake and with said air discharge systems on discharge for simultaneously moving air through said air inlet system and said air discharge systems.

2. A cooking range comprising, in combination, structure providing a horizontal cooking surface, a plurality of cooking units disposed in front and rear rows on said surface, structure providing a wall extending upwardly from said cooking surface structure rearwardly of the rearmost cooking units thereof, an air inlet system extending behind said wall, and having air inlet means opening facing said cooking surface at a level substantially above said cooking units, air filtering means, including at least a grease-trapping filter, in said air inlet system, a first air discharge system having upper outlet means to discharge a sheet-like flow of air rearwardly of the front of said cooking surface and moving forwardly of said wall above said air inlet means and substantially parallel to said cooking surface, a second air discharge system having lower outlet means to discharge a curtain-like flow of air extending upwardly and rearwardly from the front of said cooking surface to intersect said first-named air flow rearwardly of said cooking surface front and forwardly of the front row of cooking units, power operated blower means including a power operated blower communicating with said air inlet system downstream of said grease-trapping filter on intake and with said air discharge systems on discharge for simultaneously moving air through said air inlet system and said air discharge system, and said power operated blower means having air discharge outlet means upstream from said upper and lower outlet means of said first and second air discharge systems and in communication with said air inlet means for discharging air externally of the cooking range other than through said upper and lower outlet means of said first and second air discharge systems.

3. A cooking range comprising, in combination, structure providing a horizontal cooking surface, a plurality of cooking units on said surface, there being at least two said units in spaced relation on a line substantially parallel to the front edge of said cooking surface, a wall structure extending vertically from the rear of said cooking surface, an air inlet system having air inlet means on said wall structure substantially above said cooking units, said inlet means openly facing said cooking units and disposed so that said two cooking units are symmetrically related to said air inlet means, air filtering means in said air inlet system, a first air discharge system having first and second discharge nozzles located rearwardly of the front of said cooking surface respectively at each side of said air inlet means at a level above said inlet means, said nozzles being arranged to discharge relatively flat streams of air substantially parallel to the cooking surface and directed to intersect above and substantially centrally of said two units rearwardly of the front edge thereof, and a second air discharge system having first and second nozzles located adjacent the front edge of said cooking surface, said nozzles being opposite the said two cooking units and each being arranged to discharge a relatively flat blast of air which intersects the vertex of the discharge pattern of the first air discharge system at a location rearwardly of said front edge and forwardly of either of said two cooking units, power-operated blower means including power-operated blower mechanism communicating with said inlet system downstream of said air filtering means on intake and with said air discharge systems on discharge for simultaneously moving air through said air inlet system and said air discharge systems, and said power-operated blower means having air discharge outlet means upstream from said nozzles of said first and second air discharge systems and in communication with said air inlet means for discharging air externally of the cooking range other than through said nozzles of said first and second air discharge systems.

4. A cooking range comprising, in combination, structure providing a horizontal cooking surface, a plurality of cooking units on said surface, there being at least two said units in spaced relation on a line substantially parallel to the front edge of said cooking surface, a wall structure extending vertically from the rear of said cooking surface, an air inlet system having air inlet means on said wall structure at a level whereby vapors from cooking operations will follow an upward and rearward path thereto, said inlet means openly facing said cooking units and disposed so that said two cooking units are symmetrically related to said air inlet means, means in said air inlet system for removing contaminants from the air passing therethrough, an air blower mechanism having intake conduit means communicating with said air inlet means and having discharge conduit means leading externally of said range, a first air discharge system communicating with said discharge conduit means to receive therefrom a volume of air at desired positive pressure and having first and second discharge nozzles located rearwardly of the front of said cooking surface and respectively at each side of said air inlet means at a level above said inlet means, said nozzles being arranged to discharge relatively flat streams of air in a direction substantially parallel to the cooking surface and intersecting at a location inwardly of the front edge of said cooking surface and substantially centrally of the said two cooking units, and a second air discharge system served by said blower discharge conduit means and having first and second nozzles located adjacent the front edge of said cooking surface, the latter said nozzles being opposite the said two cooking units and each being arranged to discharge a relatively flat blast of air which intersects the vertex of the discharge pattern of the first air discharge system at a location above said two cooking units and rearwardly of said cooking surface front edge.

5. A cooking range comprising, in combination, structure providing a horizontal cooking surface, a plurality of cooking units on said surface, there being at least two said units in spaced relation on a line substantially parallel to the front edge of said cooking surface, a wall structure extending vertically from the rear of said cooking surface, an air inlet system having air inlet means on said wall structure substantially above said cooking units, said inlet means openly facing said cooking units and disposed so that said two cooking units are symmetrically related to said air inlet means, an air filter structure in said air inlet system, first air blower mechanism having intake conduit means communicating with said air inlet system and having discharge conduit means leading externally of said range, second air blower mechanism communicating with said air inlet means downstream of said air filter structure for supplying a volume of air at desired positive pressure, a first air discharge system served by said second air blower mechanism and having first and second discharge nozzles located rearwardly of the front of said cooking surface and respectively at each side of said air inlet means at a level above said inlet means, said nozzles being arranged to discharge relatively flat streams of air in a direction substantially parallel to the cooking surface and intersecting above the cooking surface substantially centrally of the air inlet means, a second air discharge system served by said second air blower mechanism and having first and second nozzles located adjacent the front edge of said cooking surface, the latter said nozzles being inward of the centers of said two cooking units and each being arranged to discharge an upwardly and inwardly directed blast of air which intersects the vertex of the discharge pattern of the first air discharge system at a location substantially centrally of said two cooking units and intermediate the front edge of the cooking surface and said cooking units, and means for conjointly operating said first and second air blower mechanism.

6. A cooking range according to claim 5, in which the discharge rate of air from said first air discharge system is substantially greater than the discharge rate of air from said second air discharge system.

7. A cooking range according to claim 5, in which the discharge rate of air from said first discharge system is of the order of 9 cubic feet per minute at a velocity of the order of 3800 feet per minute, and the discharge rate of air from said second discharge system is of the order of 6 cubic feet per minute at a velocity of the order of 2800 feet per minute.

8. An electric cooking range comprising:

structure providing a horizontally disposed cooking top, at least two cooking units disposed adjacent the front edge of said cooking top, a wall structure extending upwardly from said cooking top at the rear thereof, an oven projecting forward from said wall structure and having a front bottom edge rearwardly of the front edge of said cooking top, said oven having a bottom wall parallel to said cooking top and at a distance thereabove sufficient to accommodate cooking operations below said oven, an air displacement mechanism including a blower, air inlet means for said blower, said inlet means being located substantially at the intersection of said upstanding rear wall and said oven bottom wall, an air filter in said air inlet means, air outlet means from said blower, including discharge conduit means having a principal discharge remote from said cooking top, first air duct means communicating between said outlet conduit and a nozzle disposed adjacent said front bottom edge of said oven, said nozzle being adapted to discharge a flat divergent flow of air toward the front central portion of said cooking top in a path parallel thereto, and second air duct means communicating between said outlet conduit and a nozzle disposed adjacent the front edge of said cooking top, the latter said nozzle being adapted to discharge a flat divergent flow of air upwardly to intersect said first-named blast at a point intermediate said cooking top front edge and said cooking units.

References Cited in the file of this patent

UNITED STATES PATENTS

| 1,657,066 | Burke | Jan. 24, 1928 |
| 2,596,874 | Sonntag | May 13, 1952 |
| 2,954,968 | Vedder | Oct. 4, 1960 |

FOREIGN PATENTS

| 848,691 | France | July 31, 1939 |
| 1,109,342 | Germany | June 21, 1961 |